United States Patent
Nishida et al.

(10) Patent No.: US 9,698,528 B2
(45) Date of Patent: Jul. 4, 2017

(54) CONNECTOR FOR DIRECTLY CONNECTING AN INVERTER AND A MOTOR

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Shiro Nishida, Mie (JP); Junichi Mukuno, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 15/038,481

(22) PCT Filed: Nov. 28, 2014

(86) PCT No.: PCT/JP2014/081532
§ 371 (c)(1),
(2) Date: May 23, 2016

(87) PCT Pub. No.: WO2015/087717
PCT Pub. Date: Jun. 18, 2015

(65) Prior Publication Data
US 2016/0301160 A1 Oct. 13, 2016

(30) Foreign Application Priority Data

Dec. 13, 2013 (JP) .................................. 2013-257780

(51) Int. Cl.
*H01R 13/631* (2006.01)
*B60L 3/00* (2006.01)
(Continued)

(52) U.S. Cl.
CPC ............ *H01R 13/6315* (2013.01); *B60L 3/00* (2013.01); *H02K 5/225* (2013.01); *H01R 12/91* (2013.01);
(Continued)

(58) Field of Classification Search
CPC .............. H10R 13/562; H10R 13/6315; H10R 13/5202; H01R 13/565; H01R 13/58; H01R 12/91; H01R 13/28; H01R 2201/26
(Continued)

(56) References Cited

U.S. PATENT DOCUMENTS

| 8,408,927 B2 * | 4/2013 | Tashiro | .................... H01R 4/70 439/247 |
| 2007/0218747 A1 | 9/2007 | Takehara | |

(Continued)

FOREIGN PATENT DOCUMENTS

| DE | 102009029545 A1 * | 3/2011 | ......... H01R 13/6315 |
| JP | 2011-187224 | 9/2011 | |

(Continued)

OTHER PUBLICATIONS

International Search Report.
European Search Report Dated Oct. 19, 2016.

*Primary Examiner* — Abdullah Riyami
*Assistant Examiner* — Justin Kratt
(74) *Attorney, Agent, or Firm* — Gerald E. Hespos; Michael J. Porco; Matthew T. Hespos (57) ABSTRACT

A connector includes a first housing (50) supported on a first supporting surface (32A) in an inverter-side terminal block (30) in a floating manner and a second housing (60) sup-
(Continued)

ported on a second supporting surface (34A) in the inverter-side terminal block (30) in a floating manner. A first terminal (52) in the first housing (50) mates with an inverter-side terminal (82) in a direction orthogonal to the first supporting surface (32A). A second terminal (62) in the second housing (60) mates with a motor-side terminal (92) in a motor-side terminal block (40) in a direction orthogonal to the second supporting surface (34A). A braided wire (70) has one end connected to the first terminal (52) and another end connected to the second terminal (62) and is arranged slidably in directions along the first supporting surface (32A) and along the second supporting surface (34A).

3 Claims, 8 Drawing Sheets

(51) Int. Cl.
*H02K 5/22* (2006.01)
*H01R 13/56* (2006.01)
*H01R 13/52* (2006.01)
*H01R 13/28* (2006.01)
*H01R 12/91* (2011.01)
*H01R 13/58* (2006.01)

(52) U.S. Cl.
CPC .......... *H01R 13/28* (2013.01); *H01R 13/5202* (2013.01); *H01R 13/562* (2013.01); *H01R 13/565* (2013.01); *H01R 13/58* (2013.01); *H01R 2201/26* (2013.01)

(58) Field of Classification Search
USPC ................................ 439/248, 246, 247, 474
See application file for complete search history.

(56) References Cited

U.S. PATENT DOCUMENTS

| | | |
|---|---|---|
| 2011/0316373 A1 | 12/2011 | Kobayashi et al. |
| 2012/0040553 A1 | 2/2012 | Tashiro |
| 2012/0319513 A1* | 12/2012 | Okamoto ........... H01R 13/5202 310/71 |
| 2013/0040473 A1 | 2/2013 | Tanaka et al. |
| 2014/0017947 A1 | 1/2014 | Uno et al. |

FOREIGN PATENT DOCUMENTS

| | | |
|---|---|---|
| WO | 2011/016272 | 2/2011 |
| WO | 2011/055806 | 5/2011 |
| WO | 2012/056909 | 5/2012 |
| WO | 2012/137766 | 10/2012 |

* cited by examiner

CONNECTOR FOR DIRECTLY CONNECTING AN INVERTER AND A MOTOR

BACKGROUND

1. Field of the Invention

The present invention relates to a connector.

2. Description of the Related Art

Conventionally, it has been known to use a wiring harness such as a power cable in connecting an inverter and a motor in hybrid vehicles and electric vehicles. Further, in recent years, connectors have been known which directly connect an inverter and a motor by fitting an inverter-side terminal and a motor-side terminal without using a wiring harness (see Japanese Unexamined Patent Publication No. 2011-187224).

In a connector for directly connecting an inverter and a motor like the connector described in Japanese Unexamined Patent Publication No. 2011-187224, an inverter-side terminal and a motor-side terminal are normally fitted after the inverter and the motor are once positioned relative to each other. In this case, relative positions of the both terminals may be displaced in each direction due to component variations and assembly variations in fitting the terminals. If such displacements occur, it is difficult to satisfactorily fit the terminals and establish connection between the terminals.

The present invention was created in view of the above problem and aims to facilitate connection between an inverter and a motor by effectively absorbing displacements of relative positions of both terminals in each direction in fitting the terminals.

SUMMARY

A connector of the present invention is a connector for connecting an inverter and a motor and includes an inverter-side terminal block provided on the inverter side, a motor-side terminal block provided on the motor side, a first housing supported on a first supporting surface provided in the inverter-side terminal block in a floating manner, a second housing supported on a second supporting surface provided in the inverter-side terminal block in a floating manner, a first terminal held in the first housing and to be mated with an inverter-side terminal for supplying alternating-current power from the inverter in a direction orthogonal to the first supporting surface, a second terminal held in the second housing and to be mated with a motor-side terminal provided in the motor-side terminal block in a direction orthogonal to the second supporting surface, and a flexible conductive wire having one end part connected to the first terminal and the other end part connected to the second terminal and arranged slidably in each of directions along the first supporting surface and directions along the second supporting surface.

In the above connector, since the first terminal is mated with the inverter-side terminal in the direction orthogonal to the first supporting surface, displacements can be absorbed by changing a degree of mating connection when relative positions of the first terminal and the inverter-side terminal are displaced in the direction orthogonal to the first supporting surface in fitting the first terminal and the inverter-side terminal. Further, the first housing is supported on the first supporting surface in a floating manner and the conductive wire connected to the first terminal held in the first housing is slidable in the directions along the first supporting surface. Thus, if the relative positions of the first terminal and the inverter-side terminal are displaced in the direction along the first supporting surface in fitting the both terminals, the first housing and the first terminal slide in the direction along the first supporting surface together with the conductive wire, thereby being able to absorb the displacements.

On the other hand, since the second terminal is mated with the motor-side terminal in the direction orthogonal to the second supporting surface, displacements can be absorbed by changing a degree of mating connection when relative positions of the second terminal and the motor-side terminal are displaced in the direction orthogonal to the second supporting surface in fitting the second terminal and the motor-side terminal. Further, the second housing is supported on the second supporting surface in a floating manner and the conductive wire connected to the second terminal held in the second housing is slidable in the directions along the second supporting surface. Thus, if the relative positions of the second terminal and the motor-side terminal are displaced in the direction along the second supporting surface in fitting the both terminals, the second housing and the second terminal slide in the direction along the second supporting surface together with the conductive wire, thereby being able to absorb the displacements. As just described, in the above connector, displacements of the relative positions of the both terminals in each direction can be effectively absorbed in fitting the inverter-side terminal and the first terminal and fitting the motor-side terminal and the second terminal, whereby connection between the inverter and the motor can be facilitated.

In the above connector, the conductive wire may be arranged in the inverter-side terminal block, and the first and second supporting surfaces may be provided in parallel in the inverter-side terminal block.

According to this configuration, since the directions along the first supporting surface and those along the second supporting surface are the same directions, the conductive wire can be easily arranged in the inverter-side terminal block.

According to the present invention, it is possible to facilitate connection between an inverter and a motor by effectively absorbing displacements of relative positions of both terminals in each direction in fitting the terminals.

DETAILED DESCRIPTION

An embodiment is described with reference to the drawings. In this embodiment, connectors 1 are illustrated which electrically connect an unillustrated inverter and an unillustrated motor, for example, in a hybrid vehicle or an electric vehicle. Note that an X axis, a Y axis and a Z axis orthogonal to each other are shown in a part of each drawing and each axial direction is drawn to be a direction shown in each drawing. Out of these, the Z-axis direction coincides with a vertical direction with an upper side on the planes of FIGS. 2 to 8 as an upper side.

In this embodiment, the inverter is accommodated into an inverter case 10 and the motor is accommodated into a motor case 20 with an upper side as an inverter side and a lower side as a motor side. Note that, in each drawing, only a lower part of the inverter case 10 for covering a lower side of the inverter is shown and only an upper part of the motor case 20 for covering an upper side of the motor is shown.

Figure 1:
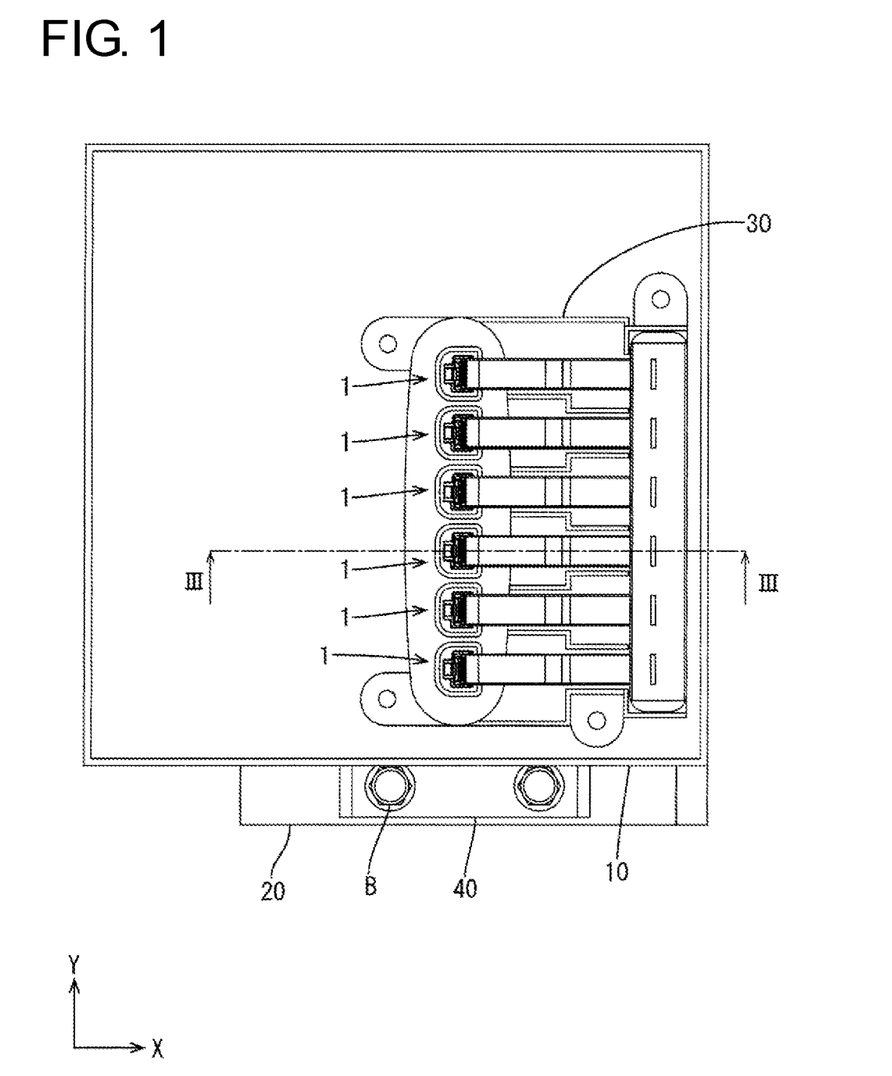
FIG. 1 is a top view of a fitted part of an inverter-side terminal block and a motor-side terminal block.
Figure 2:
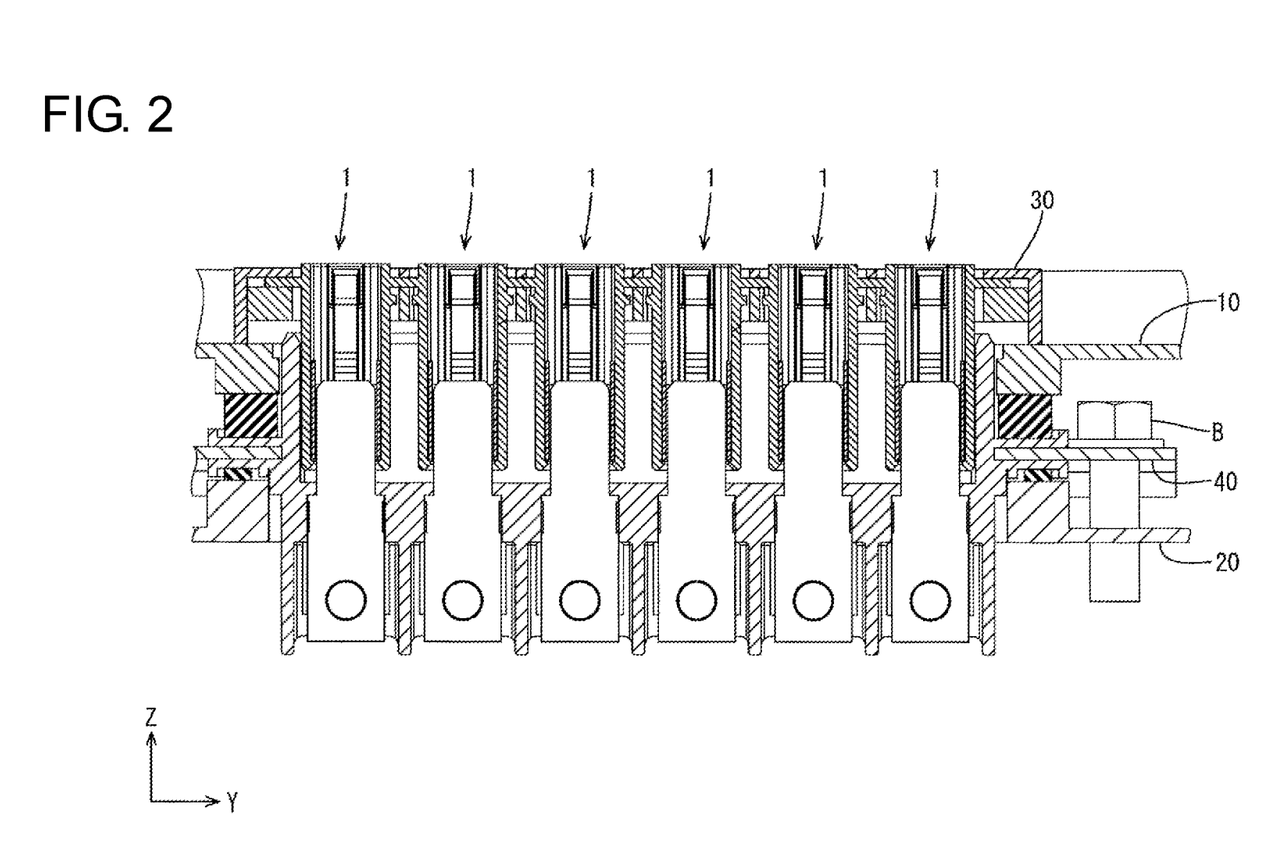
FIG. 2 is a front view of the fitted part of the inverter-side terminal block and the motor-side terminal block.

Six connectors 1 of this embodiment are arranged side by side along the Y-axis direction between the inverter side and the motor side to connect the inverter and the motor as shown in FIGS. 1 and 2. Specifically, as shown in FIGS. 3 to 7, each connector 1 is arranged between an inverter-side terminal 82 and a motor-side terminal 92 and serves as an intermediate terminal for electrically connecting the both terminals.

Figure 3:
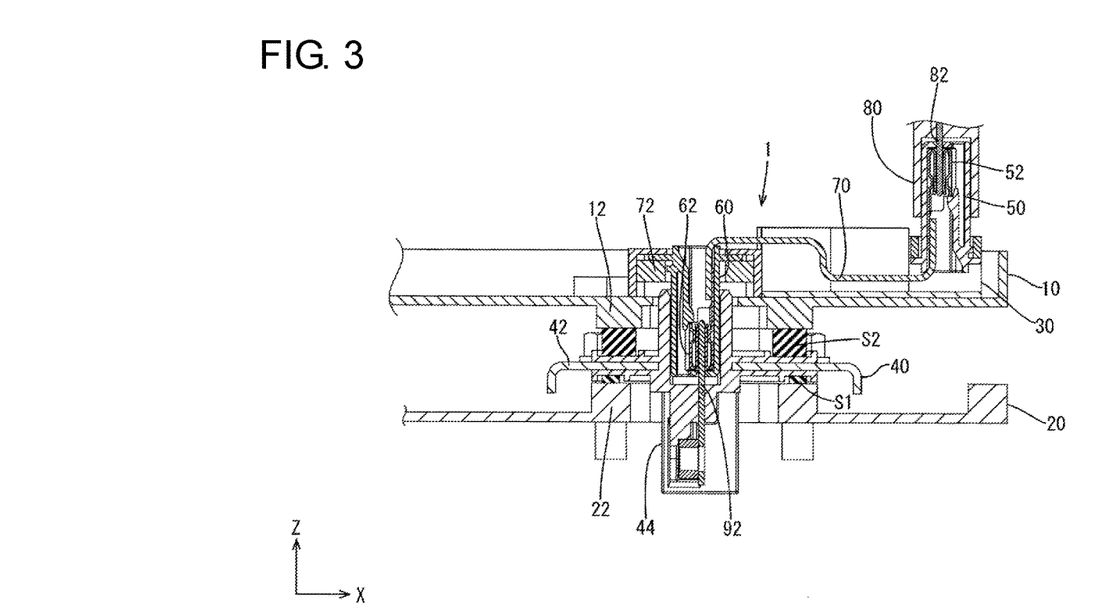
FIG. 3 is a section along III-III of FIG. 1 showing a cross-section of the fitted part of the inverter-side terminal block and the motor-side terminal block.
Figure 7:
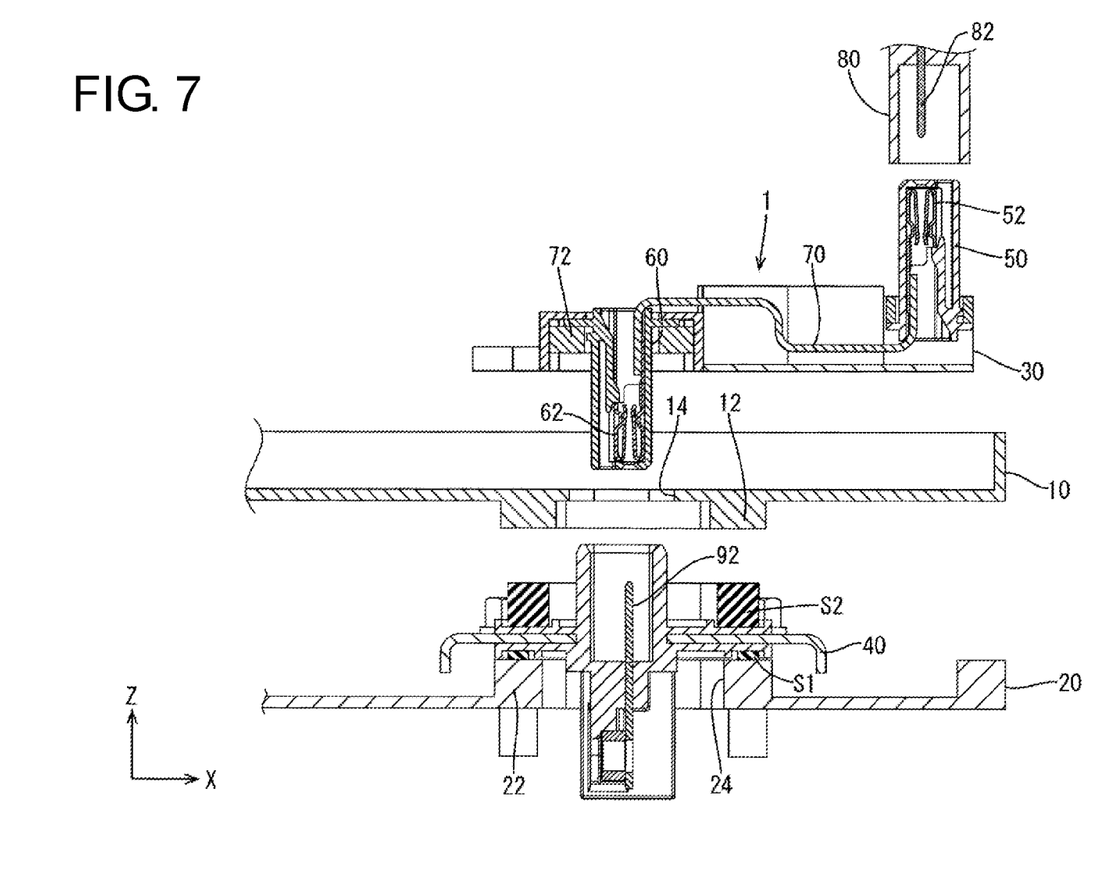
FIG. 7 is a section showing a state before the inverter-side terminal block and the motor-side terminal block are fitted.

First, the configurations of the inverter-side terminals 82, the inverter case 10 and the motor case 20 are described. The inverter-side terminal 82 is a male terminal extending from the inverter side electrically connected to the inverter and supplies alternating-current power supplied from the inverter side to the motor. As shown in FIGS. 3 and 7, the inverter-side terminal 82 is held in an inverter-side housing 80 with a lower side as a connection side. The inverter-side housing 80 is open downward and arranged above the lower part of the inverter case 10.

As shown in FIGS. 3 and 7, a part of the lower part of the inverter case 10 is provided with a rib-like inverter-side rib 12 projecting downward and an inverter-side opening 14 surrounded by this inverter-side rib 12. On the other hand, a part of the upper part of the motor case 20 is provided with a rib-like motor-side rib 22 projecting upward and a motor-side opening 24 surrounded by this motor-side rib 22.

Next, the configuration of the connector 1 is described. As shown in FIGS. 3 and 7, the connector 1 includes an inverter-side terminal block 30, a motor-side terminal block 40, a first housing 50, a first terminal 52 held in the first housing 50, a second housing 60, a second terminal 62 held in the second housing 60 and a braided wire (example of a conductive wire) 70 for connecting the first and second terminals 52, 62. Out of these, the inverter-side terminal block 30 is provided on the inverter side (upper side) and the motor-side terminal block 40 is provided in the motor side (lower side).

Figure 4:
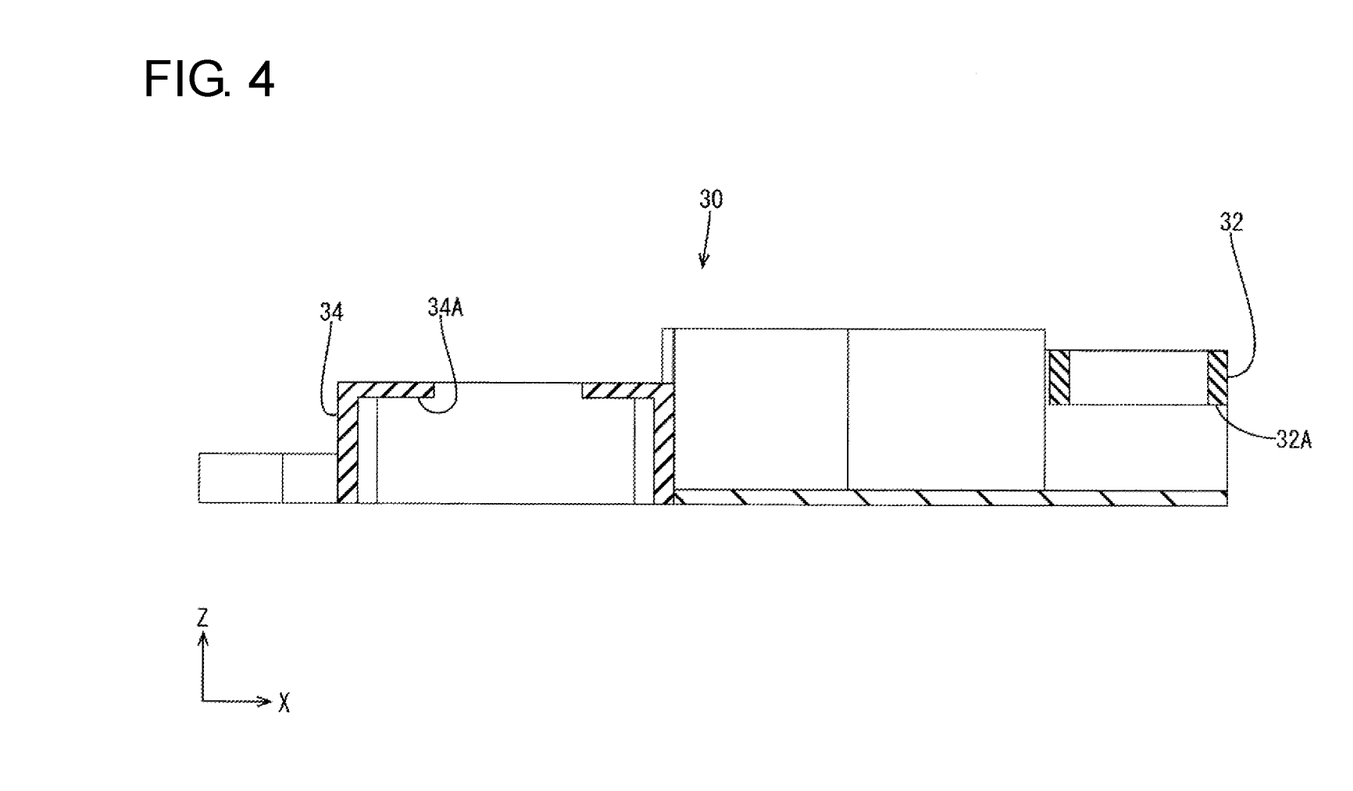
FIG. 4 is an enlarged section of the inverter-side terminal block.

As shown in FIG. 1, the inverter-side terminal block 30 is a member having a smaller size in a plan view than the lower part of the inverter case 10. As shown in FIG. 4, the inverter-side terminal block 30 is provided with a first mounting portion 32 and a second mounting portion 34. Out of these, the first mounting portion 32 overlaps with the inverter-side housing 80 in the vertical direction with the inverter-side terminal block 30 located on the lower side, and the second mounting portion 34 overlaps with a motor-side housing 90 to be described later in the vertical direction with the inverter-side terminal block 30 located on the upper side.

As shown in FIG. 4, the first mounting portion 32 is in the form of a short tube open upward and a lower opening edge surface serves as a first supporting surface 32A parallel to an X-Y plane. On the other hand, the second mounting portion 23 is in the form of a short tube open downward, an upper opening edge protrudes inwardly and this protruding surface serves as a second supporting surface 34A parallel to the X-Y plane. Thus, the first and second supporting surfaces 32A, 32A are provided in parallel to each other.

Figure 5:
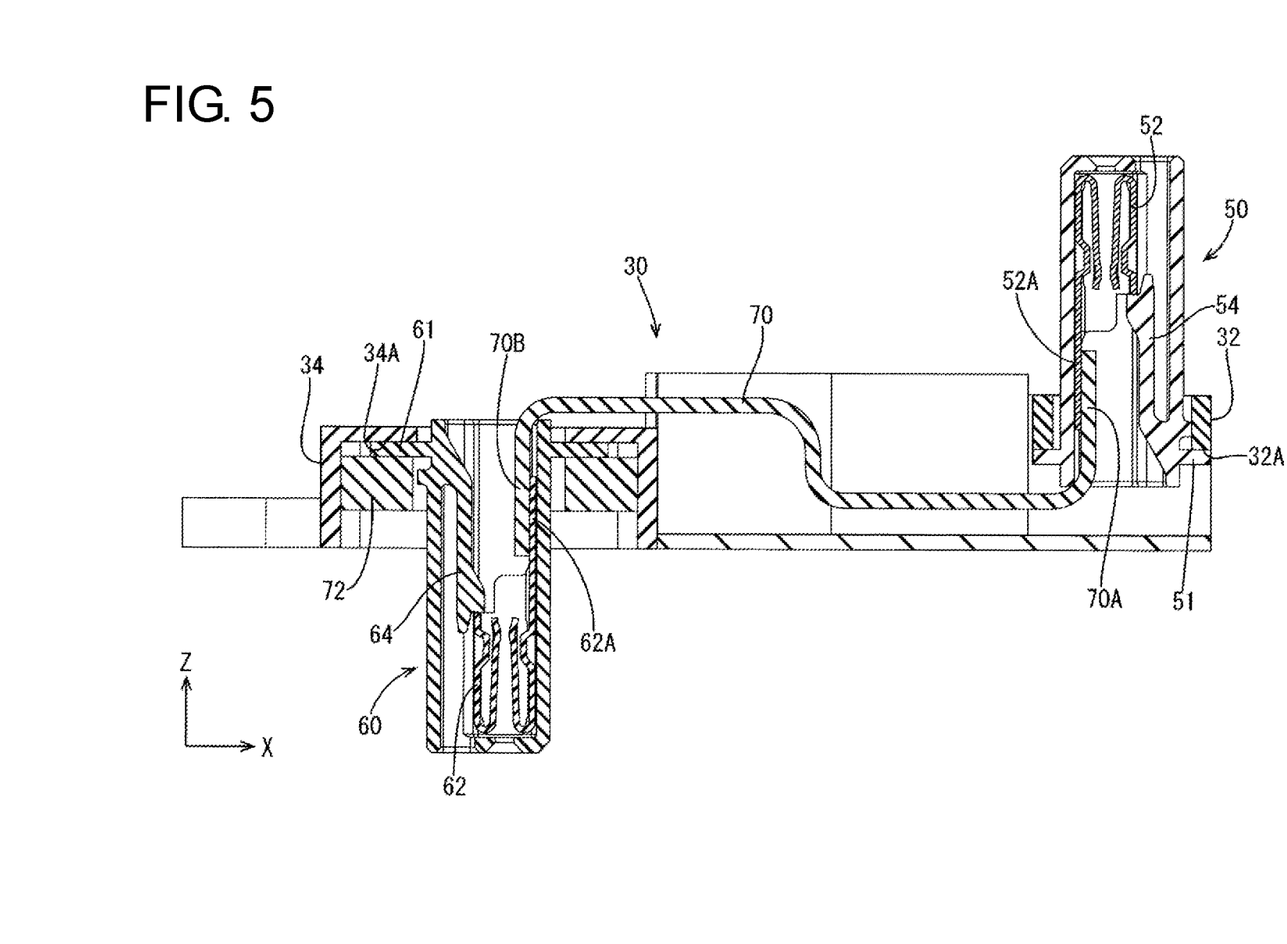
FIG. 5 is an enlarged section of the inverter-side terminal block in a state where a first housing and a second housing are supported.

As shown in FIG. 5, the first housing 50 is substantially in the form of a tube whose axial direction is aligned with the vertical direction. A first protruding portion 51 protruding outwardly in parallel to the X-Y plane is provided on the outer peripheral surface of the first housing 50 near a lower opening.

On an upper opening side in the first housing 50, the first terminal 52, which is a female terminal, is held by a locking lance 54 extending from the inner wall of the first housing 50 with a connection port thereof facing upward. A part of the first terminal 52 on a side opposite to the connection port extends up to the vicinity of the lower opening along the inner wall of the first housing 50 and serves as a first connecting portion 52A to be connected to the braided wire 70 to be described later.

The first housing 50 is mounted in the first mounting portion 32 with the first protruding portion 51 thereof placed on the first supporting surface 32A of the first mounting portion 32, thereby being supported on the first supporting surface 32A in a floating manner. The first housing 50 is slidable in directions parallel to the first supporting surface 32A, i.e. along the X-Y plane by being supported on the first supporting surface 32A in a floating manner.

As shown in FIG. 5, the second housing 60 is configured substantially identically to the first housing 50 and mounted in the second mounting portion 34 in a posture vertically inverted from that of the first housing 50. Specifically, the second housing 60 is substantially in the form of a tube whose axial direction is aligned with the vertical direction and a second protruding portion 61 protruding outwardly in parallel to the X-Y plane is provided on the outer peripheral surface of the second housing 60 near an upper opening.

On a lower opening side in the second housing 60, the second terminal 62, which is a female terminal, is held by a locking lance 64 extending from the inner wall of the second housing 60 with a connection port thereof facing downward. A part of the second terminal 62 on a side opposite to the connection port extends up to the vicinity of the upper opening along the inner wall of the second housing 60 and serves as a second connecting portion 62A to be connected to the braided wire 70 to be described later.

The second protruding portion 61 of the second housing 60 is placed on the second supporting surface 34A of the second mounting portion 34. Further, an annular retainer member 72 is mounted from the lower opening side of the second mounting portion 34 while the second housing 60 is inserted therein. In this way, the second housing 60 is mounted in the second mounting portion 34 with the second protruding portion 61 thereof sandwiched between the second supporting surface 34A and the retainer member 72, thereby being supported on the second supporting surface 34A in a floating manner. The second housing 60 is slidable in directions parallel to the second supporting surface 34A, i.e. along the X-Y plane by being supported on the second supporting surface 34A in a floating manner.

The braided wire 70 is a flexible conductive member and laid slidably in X-Y plane directions in the inverter-side terminal block 30. In other words, the braided wire 70 is arranged slidably in directions along the first supporting surface 32A and directions along the second supporting surface 34A in the inverter-side terminal block 30.

Further, one end part 70A of the braided wire 70 is electrically connected to the first connecting portion 52A of the first terminal 50 held in the first housing 50, and another end part 70B thereof is electrically connected to the second connecting portion 62A of the second terminal 62 held in the second housing 60. Thus, the first and second terminals 52, 62 are electrically connected via the braided wire 70 in the inverter-side terminal block 30.

As shown in FIGS. 1 and 2, the motor-side terminal block 40 is placed on the upper part of the motor case 20. As shown in FIG. 7, the motor-side terminal block 40 is provided with a substantially plate-like main body portion 42 and a projecting portion 44 vertically projecting from a part of the main body portion 42.

As shown in FIG. 2, the motor-side terminal block 40 is fixed to the motor case 20 by being fastened to the motor case 20 by bolts B with a plate surface of the main body portion 42 placed on the motor-side rib 22 of the motor case 20 and a lower part of the projecting portion 44 inserted in the motor-side opening 24.

Figure 6:
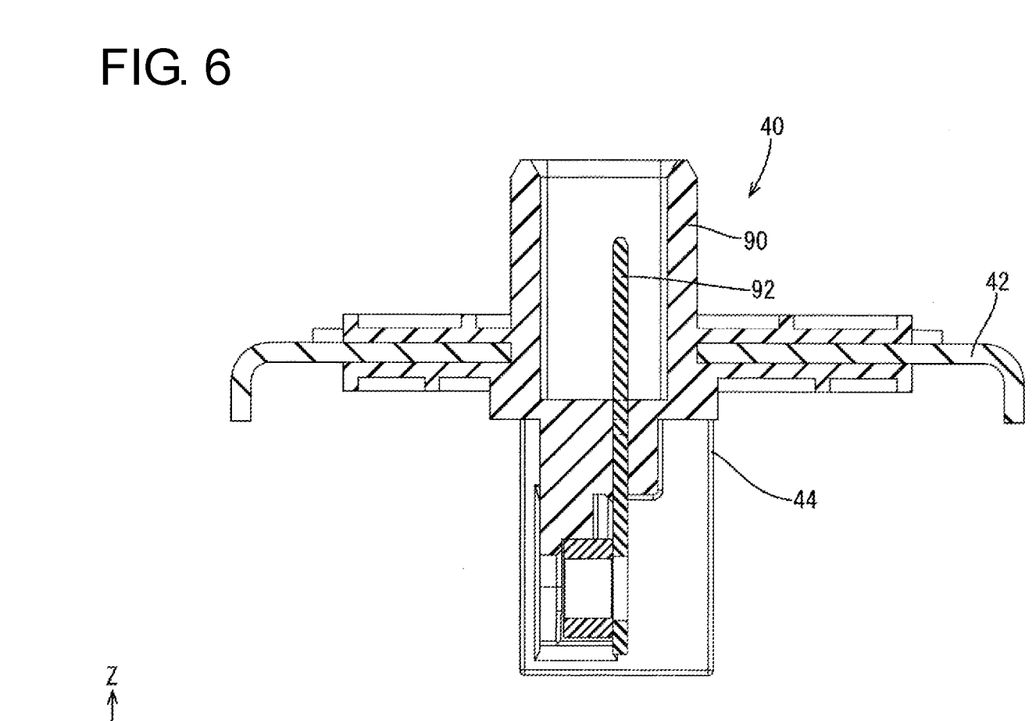
FIG. 6 is an enlarged section of the motor-side terminal block.

As shown in FIG. 6, the motor-side housing 90 open upward is provided on an upper part of the projecting portion 44 in the motor-side terminal block 40. A motor-side terminal 92, which is a male terminal, is held in the motor-side housing 90 with an upper side as a connection side. The motor-side terminal 92 extends up to a lower part of the motor-side projecting portion 44, is electrically connected to the motor and supplies alternating-current power converted by the inverter to the motor side.

The connector 1 of this embodiment is configured as described above. Next, its connecting procedure is described. In the case of connecting the inverter and the motor using the connector 1, the main body portion 42 of the motor-side terminal block 40 is placed on the motor-side rib 22 of the motor case 20 via a first seal member S1 and the lower part of the projecting portion 44 is inserted into the motor-side opening 24 of the motor case 20 as shown in FIG. 7, whereby the motor-side terminal block 40 is assembled with the motor case 20 and the both are fixed.

Note that, the first seal member S1 is arranged between the main body portion 42 of the motor-side terminal block 40 and the motor-side rib 22 in assembling the motor-side terminal block 40 with the motor-side 20 as shown in FIG. 7, thereby sealing between the main body portion 42 and the motor-side rib 22. This can prevent or suppress the intrusion of water and the like into between the motor-side main body portion 42 and the motor-side rib 22 (into the motor case 20).

Figure 8:
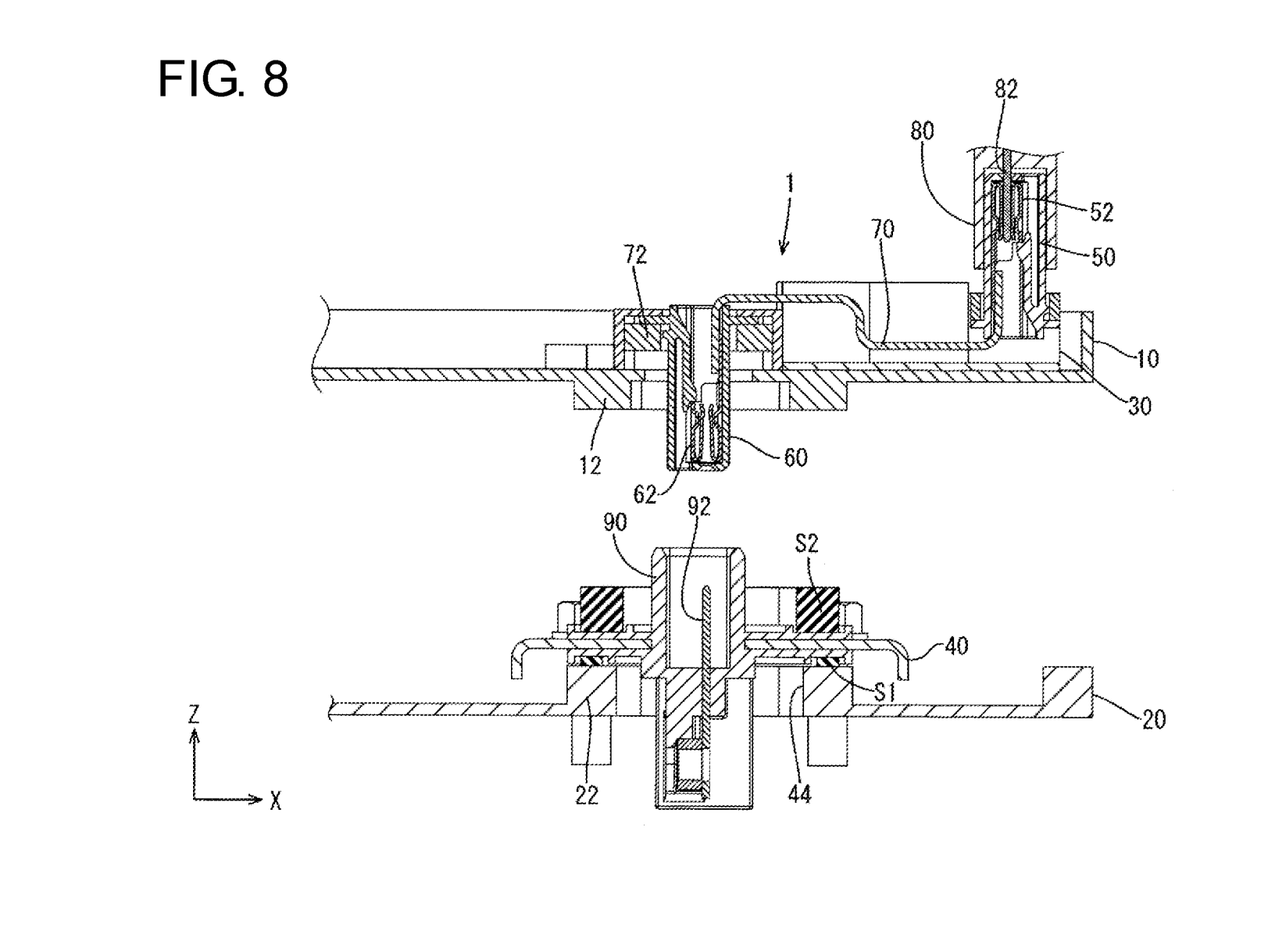
FIG. 8 is a section showing a state while the inverter-side terminal block and the motor-side terminal block are being fitted.

Subsequently, as shown in FIG. 8, the first housing 50 is fitted into the inverter-side housing 80 from above with the inverter-side terminal block 30 held in a state where the first and second housings 50, 60 are mounted in advance. In this way, the inverter-side terminal 82 and the first terminal 52 are mated in the vertical direction and electrically connected.

Subsequently, the lower surface of the inverter-side terminal block 30 is placed on the inner wall of the lower part of the inverter case 10 and the lower part of the second housing 60 is inserted into the inverter-side opening 14 of the inverter case 10 as shown in FIG. 8, whereby the connector 1 is assembled with the inverter case 10 and the both are fixed. Note that, in the inverter-side terminal block 30, the lower opening edge of the second mounting portion 34 is matched with the lower surface of the inverter-side terminal block 30 in the vertical direction. Thus, the second mounting portion 34 does not interfere with the inverter case 10 in assembling the connector 1 with the inverter case 10.

Subsequently, the inverter case 10 and the motor case 20 are positioned relative to each other in the X-Y plane directions. Here, in this embodiment, an unillustrated knock pin is provided on either one of the inverter case 10 and the motor case 20 and an unillustrated bracket is provided on the other. By fitting these knock pin and bracket, the inverter case 10 and the motor case 20 can be positioned relative to each other in the X-Y plane directions.

Subsequently, as shown in FIG. 3, the second housing 60 is fitted into the motor-side housing 90 from below after the inverter case 10 and the motor case 20 are positioned with respect to the inverter-side terminal block 30 assembled with the inverter case 10. In this way, the second terminal 62 and the motor-side terminal 92 are mated in the vertical direction and electrically connected.

Note that a second seal member S2 is arranged between the inverter-side rib 12 and the main body portion 42 of the motor-side terminal block 40 in connecting the second terminal 62 and the motor-side terminal 92 as shown in FIG. 3, thereby sealing between the inverter-side rib 12 and the main body portion 42. This can prevent or suppress the intrusion of water and the like into between the inverter case 10 and the motor-side main body portion 42 (connecting part of the second terminal 62 and the motor-side terminal 92).

By the connecting procedure as described above, the inverter-side terminal 82 and the motor-side terminal 92 are electrically connected via the connector 1 and the alternating-current power converted by the inverter is supplied to the motor. Note that since a downward acting force is applied to the motor-side terminal block 40 by the own weight of the inverter-side terminal block 30 with the second terminal 62 and the motor-side terminal 92 connected, the second terminal 62 and the motor-side terminal 92 are unlikely to be separated in the vertical direction.

In the connector 1 according to the embodiment described above, relative positions of the inverter-side terminal 82 and the first terminal 52 may be displaced in each of the X-axis direction, the Y-axis direction and the Z-axis direction due to component variations and assembly variations in fitting the both terminals 82, 52 in the above connecting procedure. In this respect, since the inverter-side terminal 82 and the first terminal 52 are mated in the direction orthogonal to the first supporting surface 32A, i.e. in the Z-axis direction in this embodiment, displacements in the Z-axis direction can be absorbed by changing a degree of mating connection. Further, since the first housing 50 having the first terminal 52 held inside is supported on the first supporting surface 32A in a floating manner and the braided wire 70 connected to the first terminal 52 is slidable in the directions along the first supporting surface 32A, i.e. in the X-Y plane directions, displacements in the X-axis direction and the Y-axis direction can be absorbed by sliding movements of the first housing and the first terminal together with the braided wire 70.

Further, in the connector 1 according to the embodiment described above, relative positions of the motor-side terminal 92 and the second terminal 62 may be displaced in each of the X-axis direction, the Y-axis direction and the Z-axis direction due to component variations and assembly variations in fitting the both terminals 92, 62 in the above connecting procedure. In this respect, since the motor-side terminal 92 and the second terminal 62 are mated in the direction orthogonal to the second supporting surface 34A, i.e. in the Z-axis direction in this embodiment, displacements in the Z-axis direction can be absorbed by changing a degree of mating connection. Further, since the second housing 60 having the second terminal 62 held inside is supported on the second supporting surface 34A in a floating manner and the braided wire 70 connected to the second terminal 62 is slidable in the directions along the second supporting surface 34A, i.e. in the X-Y plane directions, displacements in the X-axis direction and the Y-axis direction can be absorbed by sliding movements of the second housing 60 and the second terminal 62 together with the braided wire 70.

As described above, in the connector 1 of this embodiment, displacements in each of the X-axis direction, the Y-axis direction and the Z-axis direction in fitting the inverter-side terminal 82 and the first terminal 52 and fitting the motor-side terminal 92 and the second terminal 62 can be effectively absorbed. Thus, even if relative positions of the both terminals are displaced in each direction in fitting the inverter-side terminal 82 and the first terminal 52 and fitting the motor-side terminal 92 and the second terminal 62, the terminals can be satisfactorily fitted. As a result, connection between the inverter and the motor can be facilitated.

Further, in the connector 1 of this embodiment, the braided wire 70 is arranged in the inverter-side terminal block 30 and the first and second supporting surfaces 32A, 34A are provided in parallel in the inverter-side terminal block 30. By adopting this configuration, the directions along the first supporting surface 32A and those along the second supporting surface 34A are the same directions. Thus, the braided wire 70 has only to be arranged slidably in one plane direction (X-Y plane direction) and the braided wire 70 can be easily arranged in the inverter terminal 30.

Modifications of the above embodiment are listed below.

Although the first and second supporting surfaces are provided in parallel in the inverter-side terminal block in the above embodiment, the first and second supporting surfaces may not be provided in parallel in the inverter-side terminal block.

Although the inverter-side terminal is a male terminal and the first terminal is a female terminal in the above embodiment, the inverter-side terminal may be a female terminal and the first terminal may be a male terminal.

Although the motor-side terminal is a male terminal and the second terminal is a female terminal in the above embodiment, the motor-side terminal may be a female terminal and the second terminal may be a male terminal.

Although the second housing is supported by the retainer member in the inverter-side terminal block in the above embodiment, supporting modes of the first and second housings in the inverter-side terminal block are not limited.

Although the braided wire is illustrated as an example of a conductive wire in the above embodiment, the configuration of the conductive wire is not limited.

Although the embodiment of the present invention is described in detail above, it is merely illustrative and not intended to limit the scope of claims. The art set forth in the claims includes various modifications and changes of the specific example illustrated above.

LIST OF REFERENCE SIGNS

1 . . . connector
10 . . . inverter case
20 . . . motor case
30 . . . inverter-side terminal block
32 . . . first mounting portion
32A . . . first supporting surface
34 . . . second mounting portion
34A . . . second supporting surface
40 . . . motor-side terminal block
50 . . . first housing
52 . . . first terminal
60 . . . second housing
62 . . . second terminal
70 . . . braided wire
72 . . . retainer member
80 . . . inverter-side housing
82 . . . inverter-side terminal
90 . . . motor-side housing
92 . . . motor-side terminal

The invention claimed is:

1. A connector for connecting an inverter and a motor, comprising:
an inverter-side terminal block provided on the inverter side, the inverter-side terminal block having a first mounting portion with a first tube and a first supporting surface extending transverse to the first tube, and further having a second mounting portion with a second tube and a second supporting surface extending transverse to the second tube;
a motor-side terminal block provided on the motor side;
a first housing mounted at least partly in the first tube and supported on the first supporting surface, the first housing being cross-sectionally smaller than the first tube so that the first housing can float within the first tube on the first supporting surface;
a second housing mounted at least partly in the second tube and supported on the second supporting surface, the second housing being cross-sectionally smaller than the second tube so that the second housing can float within the second tube and on the second supporting surface;
a first terminal held in the first housing and to be mated with an inverter-side terminal for supplying alternating-current power from the inverter in a direction orthogonal to the first supporting surface;
a second terminal held in the second housing and to be mated with a motor-side terminal provided in the motor-side terminal block in a direction orthogonal to the second supporting surface; and
a flexible conductive wire having a first end part connected to the first terminal and a second end part connected to the second terminal and arranged slidably in each of directions along the first supporting surface and along the second supporting surface.

2. The connector of claim 1, wherein:
the conductive wire is arranged in the inverter-side terminal block; and
the first and second supporting surfaces are provided in parallel in the inverter-side terminal block.

3. The connector of claim 1, wherein the first tube opens in a first direction and the second tube opens in a second direction that is opposite to the first direction.

* * * * *